United States Patent
Lin et al.

(10) Patent No.: US 12,335,251 B2
(45) Date of Patent: Jun. 17, 2025

(54) SERVICE TO SERVICE AUTHENTICATION IN COMPUTING SYSTEMS

(71) Applicant: Microsoft Technology Licensing, LLC, Redmond, WA (US)

(72) Inventors: Chun-Hung Lin, Bellevue, WA (US); Matthias Leibmann, Redmond, WA (US)

(73) Assignee: Microsoft Technology Licensing, LLC, Redmond, WA (US)

(*) Notice: Subject to any disclaimer, the term of this patent is extended or adjusted under 35 U.S.C. 154(b) by 470 days.

(21) Appl. No.: 17/553,102

(22) Filed: Dec. 16, 2021

(65) Prior Publication Data

US 2023/0198973 A1    Jun. 22, 2023

(51) Int. Cl.
*G06F 9/455* (2018.01)
*H04L 9/40* (2022.01)

(52) U.S. Cl.
CPC ...... *H04L 63/0807* (2013.01); *G06F 9/45558* (2013.01); *H04L 63/20* (2013.01); *G06F 2009/45587* (2013.01)

(58) Field of Classification Search
CPC . H04L 63/0807; H04L 63/20; H04L 63/0815; H04L 63/0823; G06F 9/45558; G06F 2009/45587
See application file for complete search history.

(56) References Cited

U.S. PATENT DOCUMENTS

| | | | |
|---|---|---|---|
| 7,406,597 B2 | 7/2008 | Iyengar et al. | |
| 7,908,645 B2 | 3/2011 | Varghese et al. | |
| 9,117,087 B2 | 8/2015 | Tan et al. | |
| 9,935,934 B1* | 4/2018 | Orozco | H04L 9/3213 |
| 2007/0226252 A1 | 9/2007 | Iyengar et al. | |
| 2016/0087957 A1* | 3/2016 | Shah | H04L 63/205 726/1 |
| 2017/0371958 A1* | 12/2017 | Ganjam | G06F 16/353 |

(Continued)

OTHER PUBLICATIONS

"Risk Based Authentication", Retrieved from: https://help.sap.com/viewer/8b8d6fffe113457094a17701f63e3d6a/GIGYA/en-US/416de27d70b21014bbc5a10ce4041860.html, Retrieved on: Sep. 30, 2021, 34 Pages.

(Continued)

*Primary Examiner* — Shin-Hon (Eric) Chen
*Assistant Examiner* — Vladimir I Gavrilenko
(74) *Attorney, Agent, or Firm* — Schwegman Lundberg & Woessner, P.A.

(57) ABSTRACT

Techniques of service to service authentication in distributed computing systems are disclosed herein. One example technique includes identifying a token type of a security token and an authentication scheme indicated in an access request for authenticating the access request. The example technique also includes using a combination of the identified token type of the security token and the authentication scheme indicated in the access request as a key to locate an authentication pattern in a mapping table and identifying an authentication policy corresponding to the authentication pattern. The example technique can then include applying the identified authentication policy to the received data package to authenticate the access request based on the security token and conditionally providing the client service access to the platform service.

16 Claims, 9 Drawing Sheets

(56) References Cited

U.S. PATENT DOCUMENTS

2018/0367526 A1 12/2018 Huang et al.

OTHER PUBLICATIONS

Ayoub, Mina, "Microservices Authentication and Authorization Solutions", Retrieved From: https://medium.com/tech-tajawal/microservice-authentication-and-authorization-solutions-e0e5e74b248a, Apr. 24, 2018, 13 Pages.
Szyrkowiec, et al., "Automatic Intent-Based Secure Service Creation through a Multilayer SDN Network Orchestration", In journal of arXiv:1803.03106v1, Mar. 8, 2018, pp. 1-8.
"International Search Report and Written Opinion Issued in PCT Application No. PCT/US22/043923", Mailed Date: Dec. 20, 2022, 14 Pages.

\* cited by examiner

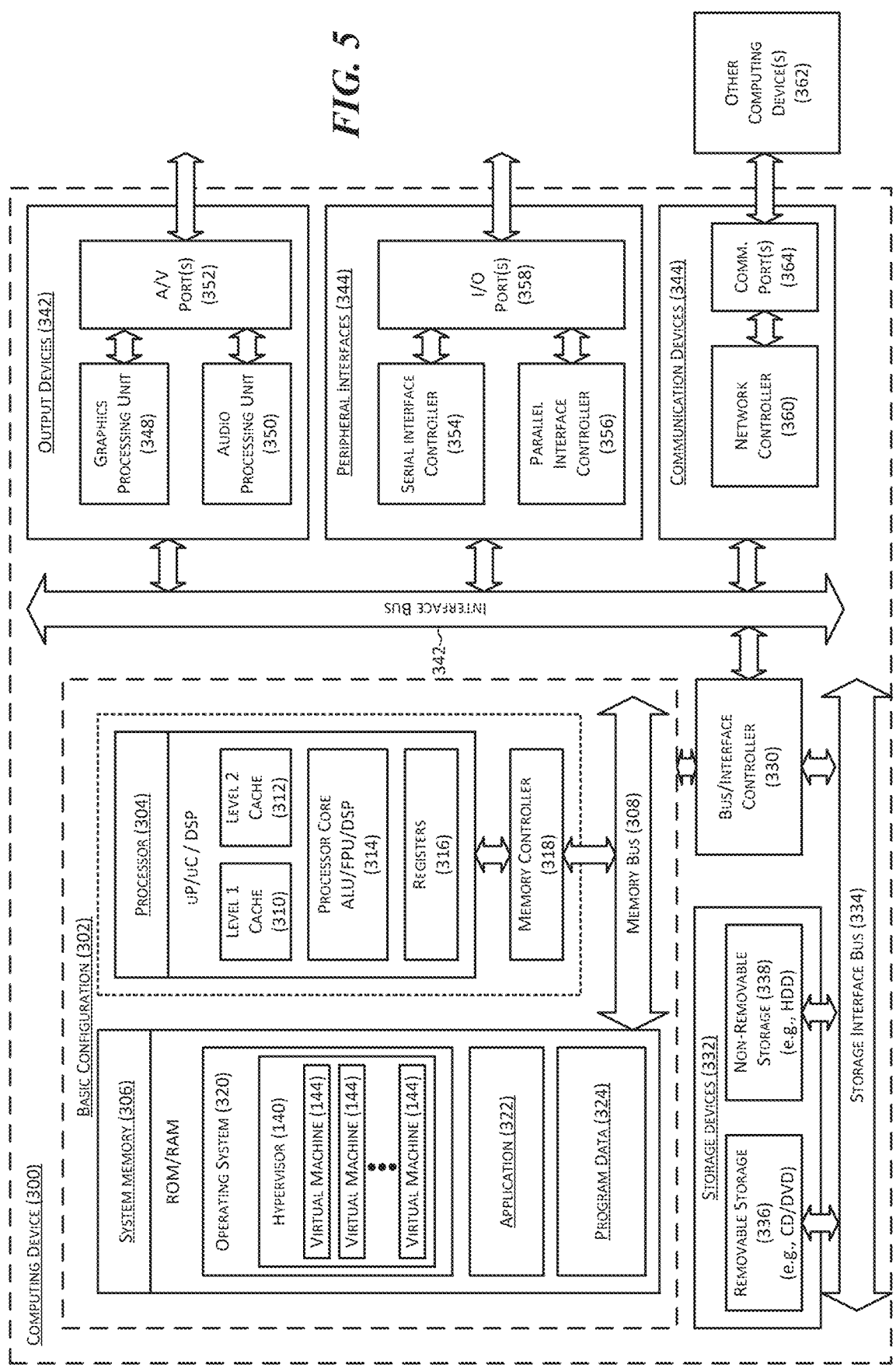

SERVICE TO SERVICE AUTHENTICATION IN COMPUTING SYSTEMS

BACKGROUND

Remote or "cloud" computing systems typically utilize large numbers of remote servers housed in datacenters to provide compute, storage, network, and other computing services. The remote servers can be interconnected by computer networks to form one or more computing clusters. Each remote server in the computing clusters can host one or more virtual machines ("VMs"), containers, virtual switches, virtual load balancers, and other virtualized functions. During operation, the virtualized functions can cooperate with one another to facilitate execution of applications and provide corresponding computing services to users.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

In certain computing facilities, remote servers in cloud computing facilities can provide computing services to multiple subscribers or tenants via virtualization of compute, storage, network, or other suitable types of physical resources. For example, a server can execute suitable instructions to provide a hypervisor for managing multiple virtual machines hosted on the server. Each virtual machine can execute suitable applications to provide corresponding computing services to users. As such, users of tenants can share physical resources as computing services at the individual servers in cloud computing facilities. On the other hand, a single tenant can also consume resources from multiple servers, storage devices, or other suitable components of cloud computing facilities as a single computing service.

To provide access to shared physical resources, certain computing facilities can organize computing services as platform services and client services that interact with one another to process user requests. For instance, a platform service can be an email exchange service that is configured to handle email reception, forwarding, synchronization, and other suitable operations. An example email exchange service is Outlook® service included in the Office 365 suite provided by Microsoft Corporation of Redmond, Washington. Upon authenticating a client service (e.g., an email client), the email exchange service can provide the client service access to content such as emails, calendar items, and attachments in corresponding mailboxes of a user.

Computing facilities can also implement an authentication service (e.g., a token issuer) that is configured to facilitate authentication between client and platform services. For instance, an authentication service can be configured to receive an authentication request for a security token from a client service. In response, the authentication service can be configured to output a user interface for receiving authentication credentials such as passwords and answer to secret questions. Upon receiving the authentication credentials from, for instance, a user, the authentication service can validate the received authentication credentials according to a suitable authentication scheme. Upon successful validation of the authentication credentials, the authentication service can be configured to generate and issue a security token (or other suitable security articles) to the client service. The client service can then submit a request along with the received security token to the platform service (or other suitable computing services) to retrieve content or performing other suitable actions.

Upon receiving the submitted request and security token, the platform service is configured to determine whether to grant access to the client service by applying an authentication policy to evaluate the request with the security token. To properly evaluate the request, the platform service typically includes code logic and configuration that recognize a token type of the security token and an authentication scheme associated with the request and identify an authentication policy for authentication based on the recognized token type and authentication scheme. A token type identifies a class of tokens used in token-based authentication. A token type can be categorized based on one or more of token structures (e.g., JSON web token), token issuers (e.g., a security token service), token versions, and other token information or "claims" of the security token. An authentication scheme can be bearer authentication, Windows authentication, certificate authentication, or another suitable authentication protocol or procedure used in evaluating security tokens.

As such, platform service owners may need to understand complexities of all the token types and authentication schemes to correctly configure the platform services to properly evaluate the received request and security token from the client service. For instance, the following example code represents a configuration at the platform service that identifies an authentication policy based on token types and authentication schemes:

```
"Security": {"Authentication": {
    "ServiceApplication": "ExampleAppAuthSvc",
    "ClientAuthenticationPolicies": {
        "PolicyId": "BearerClientPolicy",
        "AuthenticationScheme": "Bearer",
        "TokenType": "V1DelegationToken",
        "TargetApplication": "ExampleApp"
    }
}
```

In the example above, a security service application "ExampleAppAuthSvc" would apply the authentication policy "BearerClientPolicy" for a target application "ExampleApp" to a request attached with a security token of the "V1DelegationToken" type and associated with an authentication scheme of "Bearer." Upon identifying the authentication policy, the security service application can then apply the identified authentication policy "BearerClientPolicy" to process the received request and provide authentication outcome to the target service.

To accurately configure such authentication policies, the owner of the security service application would need to understand complexities of all the token types and authentication schemes used in the computing facilities. Even when the token type and authentication scheme were correctly configured, such a configuration is static. Introduction of a new token type or authentication scheme or a deprecation of an existing token type or authentication scheme may necessitate code logic and configuration changes in the target service. For example, introduction of a new token type, for instance, "V2DelegationToken," would necessitate modification of the foregoing code logic and/or configuration as well as many other platform services in the computing facility. Such code logic and configuration changes can be labor intensive, costly, and prone to error.

Several embodiments of the disclosed technology can address certain aspects of the foregoing difficulties by deploying an authentication agent that is configured to map certain features of the request and security token (e.g., combinations of token types and authentication schemes) to corresponding authentication patterns. In certain examples, the authentication agent can be a hardware/software component separate from but accessible to other platform and client services in a computing facility. In other examples, one or more platform services can each integrate an authentication agent described herein. In further examples, the authentication agent can be implemented as a part of a service library of the platform services or other suitable entities in a computing facility.

An authentication pattern as described herein is data that identifies an operating model associated with an authentication process. The operating model can include identities of an initiator/processor of an authentication process, a sequence of operations in the authentication process, an objective or goal of the authentication process, or other suitable features of the authentication process. For example, one authentication pattern can include the authentication service receiving a user request for accessing a platform service from a client application. In response, the authentication service outputs a user interface at the client application for receiving user credentials. Upon successful validation of the user credentials, the authentication service can issue a security token to the client application for accessing suitable content from the platform service. Such an authentication pattern is referred to herein as "ClientDelegation." In another example, the authentication service can receive an access request and credentials from a client service of a tenant instead of a user. Successful validation of the credential causes the authentication service to issue another security token to the client service for accessing the platform service. Such an authentication pattern is referred to herein as "ClientAppOnly."

The authentication agent can be configured to receive and inspect the request and the security token from the client service to determine a token type of the security token and a corresponding authentication scheme suitable for the request. For example, the authentication agent can be configured to parse various parts of the security token to determine a token type (e.g., "V1DelegationToken") and can inspect values in certain header fields of the request to identify an authentication scheme (e.g., "Bearer"). Upon determining the token type and authentication scheme, the authentication service can be configured to lookup in a mapping table having entries of token types and authentication schemes and corresponding authentication patterns. For example, the following are example entries of authentication patterns "Client Delegation" and "ClientAppOnly" in the mapping table and corresponding token types and authentication schemes:

| Token Type | Authentication Scheme | Authentication Pattern |
|---|---|---|
| V1DelegationToken | Bearer | ClientDelegation |
| V1AppToken | Bearer | ClientAppOnly |

In certain implementations, upon identifying the authentication pattern, the authentication agent can forward the request and the identified authentication pattern to the platform service for further processing. Upon receiving the request and the authentication pattern, the platform service can identify a suitable authentication policy based on the authentication pattern instead of token types and authentication scheme. For instance, the following example code identifies an authentication policy to be applied for the authentication pattern of "Client Delegation" at the platform service:

```
"Security": {"Authentication": {
    "ServiceApplication": " ExampleAppAuthSvc",
    "ClientAuthenticationPolicies": {
        "PolicyId": "ClientDelegationPolicy",
        "AuthenticationPattern": "ClientDelegation",
        "TargetApplication": " ExampleApp"
    }
}
```

As shown in the example code above, the service application "ExampleAppAuthSvc" would apply an authentication policy with a policy ID of "ClientDelegationPolicy" to a request that has an authentication pattern of "ClientDelegation" for "ExampleApp." Upon identifying the authentication policy, the platform service can then apply the identified authentication policy "ClientDelegationPolicy" to process the received request. In other implementations, the foregoing processing can be performed at least in part by the authentication agent or other suitable entities.

By identifying the authentication pattern, the authentication agent can allow efficient modification, addition, or deletion of token types or authentication schemes without requiring code logic or configuration changes at the platform service. For instance, in the example above, when the client service switches to a new token type of "V2DelegationToken" instead of "V1DelegationToken," the authentication agent can still identify the received request as corresponding to the same authentication pattern by adding/modifying an entry in the mapping table. For instance, the same authentication pattern "ClientDelegation" can be corresponded to a combination of token type "V2DelegationToken" and authentication scheme "Bearer" in lieu of (or in addition to) the combination of token type "V1DelegationToken" and authentication scheme "Bearer," as shown below:

| Token Type | Authentication Scheme | Authentication Pattern |
|---|---|---|
| ~~V1DelegationToken~~ | ~~Bearer~~ | ~~ClientDelegation~~ |
| V2DelegationToken | Bearer | ClientDelegation |

As such, authentication processing at the platform service can remain the same as before, and thus avoiding code logic or configuration changes at the platform service.

In certain embodiments, the authentication agent can also be configured to allow discovery of available token types and authentication schemes. For instance, a client service can submit a request to the authentication agent along with an identification of an authentication pattern (e.g., "ClientDelegation"). In response, the authentication agent can be configured to lookup the mapping table to identify one or more entries having corresponding token types and authentication schemes. For example, the authentication agent can be configured to identify both entries having "V1 DelegationToken" and "V2DelegationToken" in the table above.

In certain implementations, the authentication agent can then provide all the identified combinations of token types and authentication schemes to the client service. In turn, the client service can optionally select a combination of token type and authentication scheme and obtain a token of the token type from the authentication service before submitting the obtained token with a request identifying the authentication scheme to the platform service. In other implementations, the authentication agent can be configured to select a combination of token type and authentication scheme based on, for instance, a date/time of deployment, a version number, or other suitable criteria. The authentication agent can then provide the selected combination of token type and authentication scheme to the client service. In further embodiments, at least a portion of the foregoing discovery operations can be performed by a client library, a service library, or other suitable entities.

BRIEF DESCRIPTION OF THE DRAWINGS

FIG. 5 is a computing device suitable for certain components of the distributed computing system in FIG. 1 in accordance with embodiments of the present technology.

DETAILED DESCRIPTION

Figure 1:
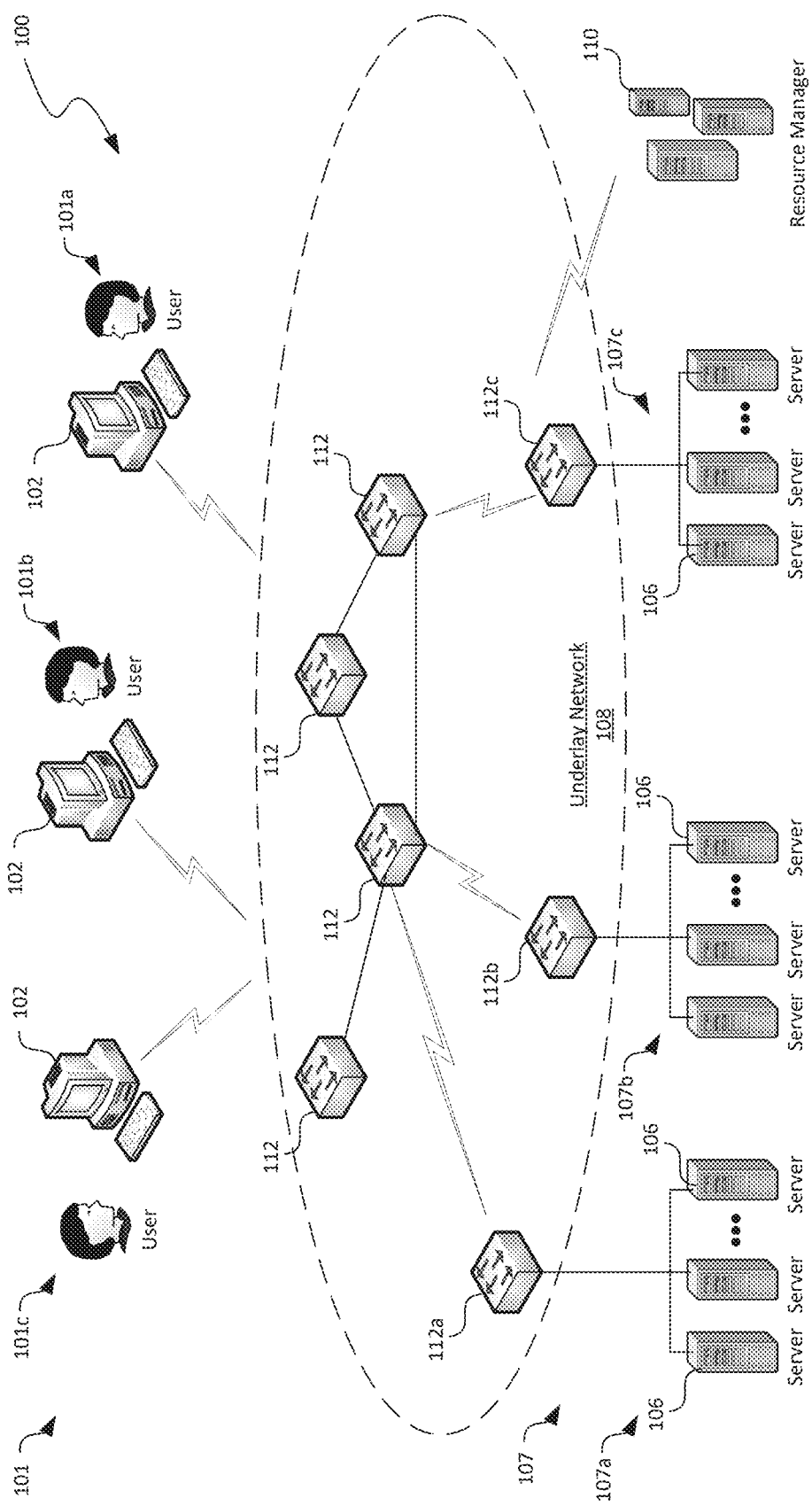
FIG. 1 is a schematic diagram illustrating a distributed computing system implementing service to service authentication in accordance with embodiments of the disclosed technology.

Certain embodiments of systems, devices, components, modules, routines, data structures, and processes for implementing service to service authentication in distributed computing systems are described below. In the following description, specific details of components are included to provide a thorough understanding of certain embodiments of the disclosed technology. A person skilled in the relevant art will also understand that the technology can have additional embodiments. The technology can also be practiced without several of the details of the embodiments described below with reference to FIGS. 1-5.

A distributed computing system can include a computing facility having one or more computer networks interconnecting a plurality of host machines to one another or to external networks (e.g., the Internet). An example of such a computing facility can include a datacenter for providing cloud computing services. A compute network can include a plurality of network devices, examples of which include routers, switches, hubs, bridges, load balancers, security gateways, or firewalls. A host can be a server or other suitable types of hardware/software computing device that is configured to provide a hypervisor that supports one or more virtual machines, virtual switches, or other suitable types of virtual components.

A host can execute suitable instructions to provide a hypervisor that includes computer software, firmware, and/or hardware configured to create, manage, and run one or more virtual machines on the host. A virtual machine or VM is an emulation of a physical computing system using computer software. Different virtual machines can be configured to provide suitable computing environment to execute different processes for the same or different users on a single host machine. During operation, a hypervisor on the host can present different virtual machines with a virtual operating platform to hardware resources on the host machine and manages execution of various processes for the virtual machines.

Virtual machines can execute suitable applications to provide computing or cloud services that deliver one or more computing resources over a computer network such as the Internet. Example cloud services include software as a service (SaaS), platform as a service (PaaS), and infrastructure as a service (IaaS). SaaS is a software distribution technique in which software applications are hosted by a cloud service provider in, for instance, datacenters, and accessed by users over a computer network. PaaS generally refers to delivery of operating systems and associated services over the computer network without requiring downloads or installation. IaaS generally refers to outsourcing equipment used to support storage, hardware, servers, network devices, or other components, all of which are made accessible over a computer network.

To access various computing services, a user or application may authenticate itself according to an authentication scheme. An authentication scheme is a set of distinct requirements for credentials, procedures and/or protocols, or other distinct operational characteristics related to an authentication process. For example, bearer authentication is an authentication scheme that utilizes data packages called bearer tokens. A bearer token is a cryptic string that is usually generated by a server in response to a token request. A bearer token allows an entity (e.g., a user, a device, or a computing service) presenting the bearer token to access certain computing resources or perform computing operations. In another example, Windows authentication (formerly named NTLM, and also referred to as Windows NT Challenge/Response authentication) is an authentication scheme that hashes an entered username and password before sending across a network. In yet another example, certificate authentication uses a digital certificate issued by a trusted certificate authority to identify a user, machine, device, or computing service before granting access to a resource, network, application, etc. Other examples can include container authentication, challenge-handshake authentication, extensible authentication, and other suitable authentication schemes.

To facilitate authentication, a distributed computing system can deploy an authentication service. An authentication service is a computing service that is configured to facilitate an authentication process upon receiving an authentication request from a requester, such as a user or another computing service. One example authentication service is the Security Token Service (STS), which is a cross-platform open standard component of a single sign-on infrastructure framework. Within that claim-based identity framework, STS can be responsible for issuing, renewing, and cancelling security tokens. The security tokens issued by STS can then be used to identify a holder (e.g., a user or computing service) of the security token to other computing services for accessing resources and/or performing suitable actions.

A security token, access token, or token is a digital data package that contains security credentials for a logon session and identifies an entity, a group of the entity, privilege(s) of the entity, and, in some cases, a particular application.

Example security tokens can include a string of plaintext or encoded characters that is composed of various fields and values thereof. Example fields can include an identifier, an identification of a logon session, a user identifier, a default owner, and/or other suitable fields.

An authentication pattern can include data that identifies an operating model associated with an authentication process. The operating model can include identities of an initiator/processor of an authentication process, a sequence of operations performed during the authentication process, an objective or goal of the authentication process, or other suitable features of the authentication process. For example, one authentication pattern can include the authentication service receiving a user request for accessing a platform service from a client application. In response, the authentication service outputs a user interface at the client application for receiving user credentials. Upon successful validation of the user credentials, the authentication service can issue a security token to the client application for accessing suitable content from the platform service. Such an authentication pattern is referred to herein as "ClientDelegation." In another example, the authentication service can receive an access request and credentials from a client service of a tenant instead of a user. Successful validation of the credential causes the authentication service to issue another security token to the client service for accessing the platform service. Such an authentication pattern is referred to herein as "ClientAppOnly."

An authentication pattern can be indexed to one or more features of the authentication process. For example, in the description below, a combination of token type and authentication scheme is used as an example key to identify an authentication pattern, such as "ClientDelegation" or "ClientAppOnly." In other examples, an authentication pattern can also be indexed to token version, initiator of the authentication process, or other suitable features of the authentication process.

In certain computing facilities, authenticating a client service to a platform service can involve submitting a request to the platform service with a security token obtained from a token issuer such as an authentication service. The platform service can then determine whether to grant access to the client service by applying an authentication policy to evaluate the request and the security token. To properly evaluate the request, the platform service typically includes code logic and configuration that recognize a token type of the security token and an authentication scheme identified in the request and select an authentication policy for authentication based thereon. As such, platform service owners may need to understand complexities of various token types and authentication schemes to correctly configure the platform service. Even when the token type and authentication scheme were correctly configured, such a configuration is static. Introduction of a new token type or authentication scheme or a deprecation of an existing token type or authentication scheme may necessitate code logic and configuration changes in the target service.

Several embodiments of the disclosed technology can address certain aspects of the foregoing difficulties by deploying an authentication agent that is configured to map certain features of the request and security token (e.g., combinations of token types and authentication schemes) to corresponding authentication patterns. Upon receiving the request, the platform service can then identify a suitable authentication policy based on the authentication pattern instead of token types and authentication scheme. By identifying the authentication pattern, the authentication agent can allow efficient modification, addition, or deletion of token types or authentication schemes without requiring code logic or configuration changes at the platform service, as described in more detail below with reference to FIGS. 1-5.

Though the disclosed technology is described below using token authentication as an example authentication technology, in other implementations, other authentication technology using different authentication credentials can also be mapped to corresponding authentication patterns for applying authentication policies. For example, a client service can use a digital certificate to authenticate to a platform service. An authentication agent can be configured to map an authentication scheme corresponding to the digital certificate to an authentication pattern and apply a suitable authentication policy. In another example, a client service can use basic credentials to authenticate to the platform service. An authentication agent can map the basic credentials to an authentication pattern for applying a suitable authentication policy.

FIG. 1 is a schematic diagram illustrating a distributed computing system 100 implementing service to service authentication in accordance with embodiments of the disclosed technology. As shown in FIG. 1, the distributed computing system 100 can include a computer network (shown as an "underlay network 108") interconnecting a plurality of host machines shown as servers 106, a plurality of client devices 102 of users 101, and a resource manager 110 to one another. The resource manager 110 can be a cluster controller, a fabric controller, a database controller, and/or other suitable types of controllers configured to monitor and manage resources and operations of the servers 106 and/or other components in the distributed computing system 100. Even though particular components of the computing system 100 are shown in FIG. 1, in other embodiments, the computing system 100 can also include network storage devices, maintenance managers, and/or other suitable components (not shown) in addition to or in lieu of the components shown in FIG. 1.

As shown in FIG. 1, the underlay network 108 can include multiple network devices 112 that interconnect the multiple servers 106 and the client devices 102. In certain embodiments, the servers 106 can be organized into racks, action zones, groups, sets, or other suitable divisions. For example, in the illustrated embodiment, the servers 106 are grouped into three clusters 107 identified individually as first, second, and third clusters 107a-107c. In the illustrated embodiment, each of the clusters 107a-107c is operatively coupled to a corresponding network device 112a-112c, respectively, which are commonly referred to as top-of-rack or TOR network devices. The TOR network devices 112a-112c can then be operatively coupled to additional network devices 112 to form a network in a hierarchical, flat, mesh, or other suitable types of topologies. The underlay network 108 can allow communications among the servers 106 and the client devices 102. In other embodiments, the multiple clusters 107 can share a single network device 112 or can have other suitable network arrangements.

The servers 106 can individually be configured to provide computing, storage, and/or other suitable cloud computing services to the individual users 101. For example, as described in more detail below with reference to FIG. 2, each of the servers 106 can initiate and maintain one or more virtual machines 144 (shown in FIG. 2) upon requests from the users 101. The users 101 can then utilize the instantiated virtual machines 144 to execute suitable processes for performing computation, communication, and/or other suitable tasks. In certain embodiments, one of the servers 106 can provide virtual machines 144 for multiple users 101. In other embodiments, multiple servers 106 can host virtual machines 144 for one or more users 101a-101c.

The client devices 102 can each include a computing device that facilitates corresponding users 101 or administrator 104 to access computing services provided by the servers 106 via the underlay network 108. For example, in the illustrated embodiment, the client devices 102 individually include a desktop computer. In other embodiments, the client devices 102 can also include laptop computers, tablet computers, smartphones, or other suitable computing devices. Even though three users 101 are shown in FIG. 1 for illustration purposes, in other embodiments, the distributed computing system 100 can facilitate any suitable numbers of users 101 or administrators to access cloud and/or other suitable types of computing services provided by the servers 106 and/or other components in the distributed computing system 100.

Figure 2:
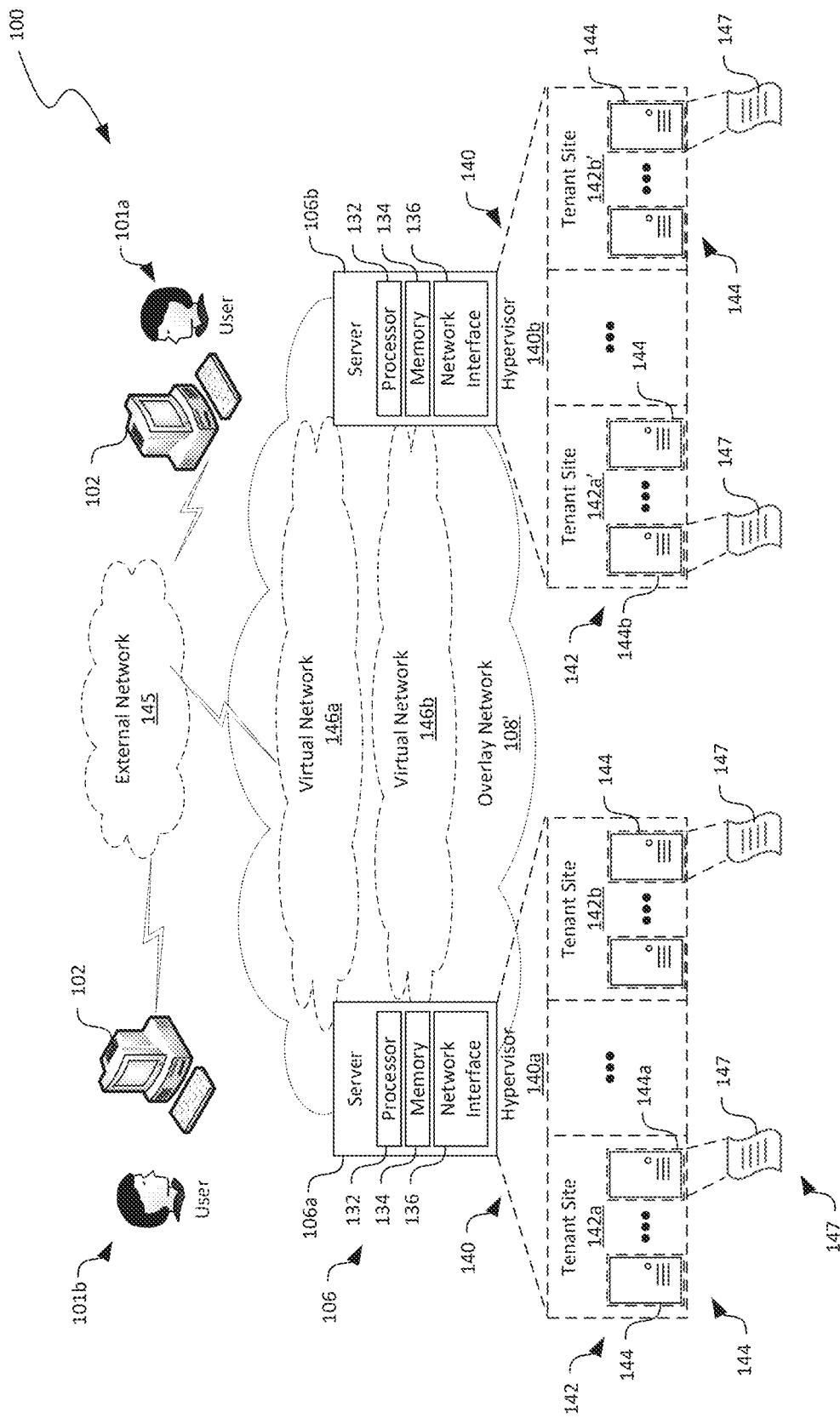
FIG. 2 is a schematic diagram illustrating certain hardware and software components of the distributed computing system of FIG. 1 in accordance with embodiments of the disclosed technology.

FIG. 2 is a schematic diagram illustrating an overlay network 108' that can be implemented on the underlay network 108 in FIG. 1 in accordance with embodiments of the disclosed technology. In FIG. 2, only certain components of the underlay network 108 of FIG. 1 are shown for clarity. As shown in FIG. 2, the first server 106a and the second server 106b can each include a processor 132, a memory 134, and a network interface 136 operatively coupled to one another. The processor 132 can include one or more logic processors, microprocessors, field-programmable gate arrays, and/or other suitable logic devices. The memory 134 can include volatile and/or nonvolatile media (e.g., ROM; RAM, magnetic disk storage media; optical storage media; flash memory devices, and/or other suitable storage media) and/or other types of computer-readable storage media configured to store data received from, as well as instructions for, the processor 132 (e.g., instructions for performing the methods discussed below with reference to FIGS. 4A and 4B). The network interface 136 can include a network interface card, a connection converter, and/or other suitable types of input/output devices configured to accept input from and provide output to other components on the overlay networks 108'.

The first server 106a and the second server 106b can individually contain instructions in the memory 134 executable by the processor 132 to cause the individual servers 106a and 106b to provide a hypervisor 140 (identified individually as first and second hypervisors 140a and 140b). The hypervisors 140 can be individually configured to generate, monitor, terminate, and/or otherwise manage one or more virtual machines 144 organized into tenant sites 142. For example, as shown in FIG. 2, the first server 106a can provide a first hypervisor 140a that manages first and second tenant sites 142a and 142b, respectively. The second server 106b can provide a second hypervisor 140b that manages first and second tenant sites 142a' and 142b', respectively. The hypervisors 140 are individually shown in FIG. 2 as software components. However, in other embodiments, the hypervisors 140 can also include firmware and/or hardware components.

The tenant sites 142 can each include multiple virtual machines 144 for a particular tenant. For example, the first server 106a and the second server 106b can both host the tenant site 142a and 142a' for a first user 101a. The first server 106a and the second server 106b can both host the tenant site 142b and 142b' for a second user 101b. Each virtual machine 144 can be executing applications or processes 147 corresponding to an operating system, middleware, and/or suitable applications. The executed applications or processes 147 can each correspond to one or more computing services or other suitable types of computing services. Examples of such computing services can include platform services, client services, authentication services, as discussed in more detail below with reference to FIGS. 3A-3E.

Also shown in FIG. 2, the overlay network 108' can include one or more virtual networks 146 that interconnect the tenant sites 142a and 142b across the first and second servers 106a and 106b. For example, a first virtual network 146a interconnects the first tenant sites 142a and 142a' at the first server 106a and the second server 106b. A second virtual network 146b interconnects the second tenant sites 142b and 142b' at the first server 106a and the second server 106b. Even though a single virtual network 146 is shown as corresponding to a single tenant site 142, in other embodiments, multiple virtual networks (not shown) may be configured to correspond to a single tenant site 146.

The virtual machines 144 on the virtual networks 146 can communicate with one another via the underlay network 108 (FIG. 1) even though the virtual machines 144 are located or hosted on different servers 106. Communications of each of the virtual networks 146 can be isolated from other virtual networks 146. In certain embodiments, communications can be allowed to cross from one virtual network 146 to another through a security gateway or otherwise in a controlled fashion. A virtual network address can correspond to one of the virtual machines 144 in a particular virtual network 146. Example virtual network addresses can include IP addresses, MAC addresses, and/or other suitable addresses.

In operation, the servers 106 can facilitate communications among the virtual machines 144 and/or applications 147 executing in the virtual machines 144. For example, the processor 132 of the first server 106a can execute suitable network communication operations to facilitate the first virtual machine 144a to transmit packets to the second virtual machine 144b via the virtual network 146a by traversing the network interface 136 on the first server 106a, the underlay network 108 (FIG. 1), and the network interface 136 on the second server 106b. As such, the first virtual machine 144a of a tenant site 142a on the first server 106a can cooperate with another virtual machine 144b on another server 106b to execute suitable applications or processes 147 to provide suitable computing services to the users 101.

FIGS. 3A-3E are schematic block diagrams illustrating example components of an authentication agent facilitating service to service authentication in the distributed computing system 100 of FIG. 1 in accordance with embodiments of the present technology. In FIGS. 3A-3E and in other Figures herein, individual software components, objects, classes, modules, and routines may be a computer program, procedure, or process written as source code in C, C++, C#, Java, and/or other suitable programming languages. A component may include, without limitation, one or more modules, objects, classes, routines, properties, processes, threads, executables, libraries, or other components. Components may be in source or binary form. Components may also include aspects of source code before compilation (e.g., classes, properties, procedures, routines), compiled binary units (e.g., libraries, executables), or artifacts instantiated and used at runtime (e.g., objects, processes, threads).

Components within a system may take different forms within the system. As one example, a system comprising a first component, a second component, and a third component. The foregoing components can, without limitation, encompass a system that has the first component being a property in source code, the second component being a binary compiled library, and the third component being a thread created at runtime. The computer program, procedure, or process may be compiled into object, intermediate, or machine code and presented for execution by one or more processors of a personal computer, a tablet computer, a network server, a laptop computer, a smartphone, and/or other suitable computing devices.

Equally, components may include hardware circuitry. In certain examples, hardware may be considered fossilized software, and software may be considered liquefied hardware. As just one example, software instructions in a component may be burned to a Programmable Logic Array circuit or may be designed as a hardware component with appropriate integrated circuits. Equally, hardware may be emulated by software. Various implementations of source, intermediate, and/or object code and associated data may be stored in a computer memory that includes read-only memory, random-access memory, magnetic disk storage media, optical storage media, flash memory devices, and/or other suitable computer readable storage media. As used herein, the term "computer readable storage media" excludes propagated signals.

Figure 3A:
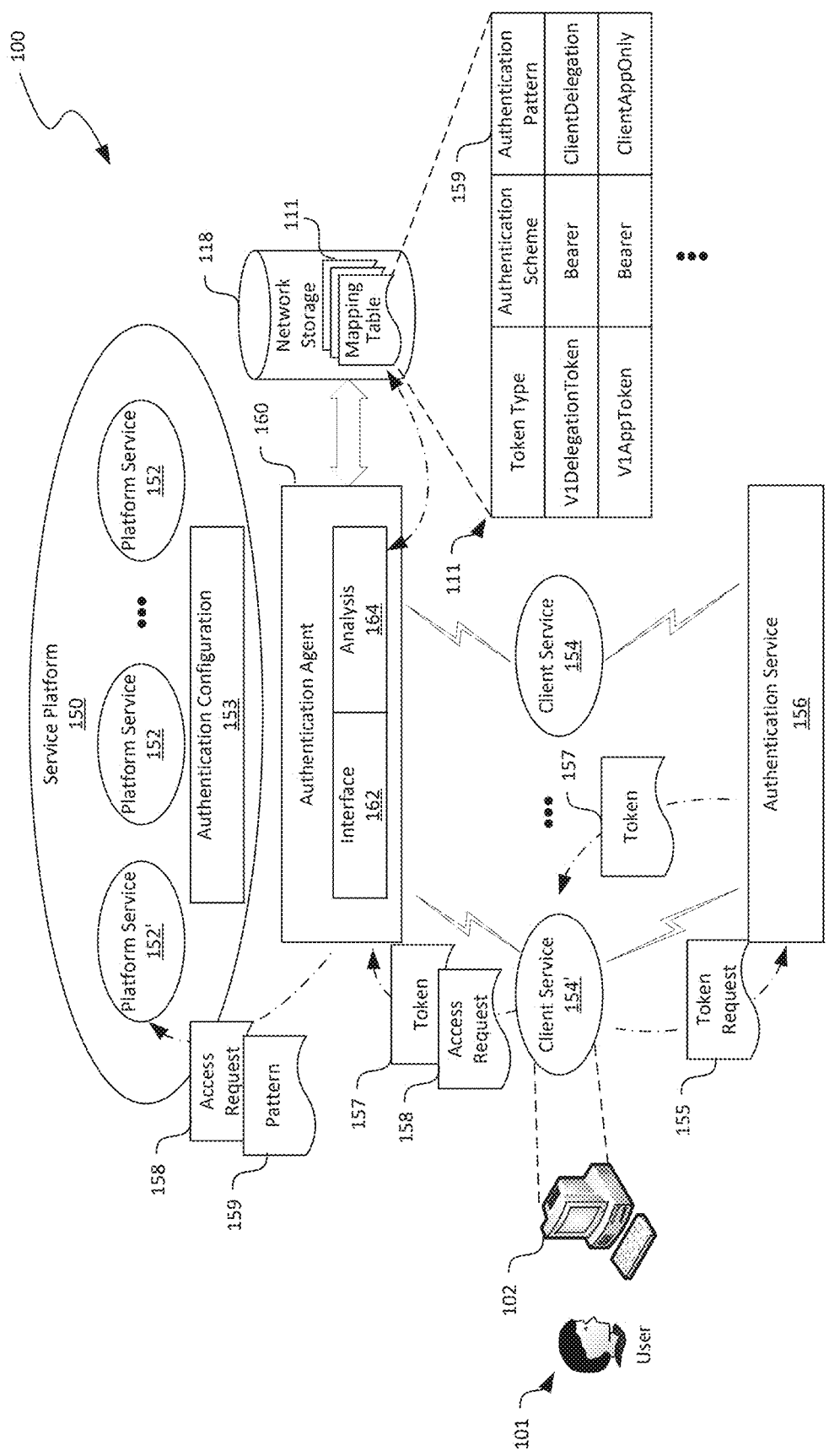
FIGS. 3A-3E are schematic block diagrams illustrating example components of an authentication agent facilitating service to service authentication in the distributed computing system of FIG. 1 in accordance with embodiments of the present technology.

As shown in FIG. 3A, the distributed computing system 100 can be configured to provide computing services organized as a collection of platform services 152 in a service platform 150 and client services 154 that are configured to interact with the platform services 152. For instance, a platform service 152' can be an email exchange service that is configured to handle email reception, forwarding, synchronization, and other suitable operations. An example email exchange service is Outlook® service included in the Office 365 suite provided by Microsoft Corporation of Redmond, Washington. Upon authenticating to the email exchange service, a client service 154' can be allowed to access content such as emails and attachments in corresponding mailboxes of a user 101. In the illustrated example, the client service 154' is shown as a computing service (e.g., an email client) residing on a client device 102 of the user 101. In other examples, the client service 154' can also be hosted on one or more servers 106 (FIG. 1) of the distributed computing system 100 or at other suitable locations.

To facilitate operations between pairs of the platform services 152 and the client services 154, the distributed computing system 100 can also provide an authentication service 156 configured to issue security tokens 157 to the various computing services. For example, as illustrated in FIG. 3A, upon receiving an access request 158 from the user 101 for accessing the platform service 152', the client service 154' can be configured to transmit a token request 155 to the authentication service 156 via a computer network. Upon receiving the token request 155, the authentication service 156 can be configured to, for instance, output a user interface (not shown) to the client device 102 for receiving credentials from the user 101. The authentication service 156 can then authenticate any received credentials, and upon successful authentication, issue a token 157 to the client service 154'. In other examples, the authentication service 156 can also authenticate the token request 155 using a digital certificate or via other suitable means.

Upon receiving the token 157, the client service 154' can be configured to transmit the access request 158 along with the token 157 to the platform service 152' for requesting access. According to certain aspects of the disclosed technology, the distributed computing system 100 can also include an authentication agent 160 that is configured to map certain features of the access request 158 and the token 157 to a corresponding authentication pattern 159. In the description below, a combination of token type and authentication scheme is used as an example of such features. In other examples, the authentication pattern 159 can be indexed to other features of the access request 158 and/or token 157 in addition to or in lieu of token type and authentication scheme.

As shown in FIG. 3A, the authentication agent 160 can include an interface component 162 and an analysis component 164 interconnected to a network storage 118 containing a mapping table 111. In certain examples, the authentication agent 160 can be a hardware/software component separate from but accessible to other platform and client services 152 and 154 in the distributed computing system 100. In other examples, one or more platform services 152 can each integrate an authentication agent 160 described herein. In further examples, the authentication agent 160 can be implemented as a part of a service library of the platform services 152 or other suitable entities in the distributed computing system 100. Though specific example components of the authentication agent 160 are shown in FIG. 3A, in other implementations, the authentication agent 160 can also include network, database, or other suitable types of components.

The interface component 162 can be configured to intercept or otherwise receive the access request 158 and the token 157 from the client service 154'. The interface component 162 can be configured to verify a sender (e.g., the client service 154') of the access request 158, timestamp the received access request 158, or perform other suitable actions before forwarding the access request 158 and the token 157 to the analysis component for further processing.

The analysis component 164 can be configured to inspect the access request 158 and the token 157 from the client service 154' to determine a token type of the token 157 and a corresponding authentication scheme suitable for the access request 158. For example, the analysis component 164 can be configured to parse various parts of the token 157 to determine a token type (e.g., "V1DelegationToken") and can inspect values in certain header fields of the access request 158 to identify an authentication scheme (e.g., "Bearer"). Upon determining the token type and authentication scheme, the analysis component 164 can be configured to lookup in the mapping table having entries of token types and authentication schemes and corresponding authentication patterns 159. For example, as shown in FIG. 3A, example entries for authentication patterns 159 "Client Delegation" and "ClientAppOnly" in the mapping table 111 and corresponding token types and authentication schemes:

| Token Type | Authentication Scheme | Authentication Pattern |
|---|---|---|
| V1DelegationToken | Bearer | ClientDelegation |
| V1AppToken | Bearer | ClientAppOnly |

In certain implementations, upon identifying the authentication pattern 159, the analysis component 164 of the authentication agent 160 can forward the access request 158 and the identified authentication pattern 159 to the platform service 152' for further processing. Upon receiving the access request 158 and the authentication pattern 159, the platform service 152' can be configured to identify a suitable authentication policy based on the authentication pattern 159 instead of token types and authentication scheme according to an authentication configuration 153. For instance, the following example code identifies an authentication configuration 153 indicating an authentication policy to be applied for the authentication pattern 159 of "Client Delegation" at the platform service 152':

```
"Security": {"Authentication": {
    "ServiceApplication": " ExampleAppAuthSvc",
    "ClientAuthenticationPolicies": {
        "PolicyId": "ClientDelegationPolicy",
        "AuthenticationPattern": "ClientDelegation",
        "TargetApplication": " ExampleApp"
    }
}
```

As shown in the example code above, the service application "ExampleAppAuthSvc" would apply an authentication policy with a policy ID of "ClientDelegationPolicy" to the access request 158 that has an authentication pattern 159 of "ClientDelegation" for a platform service 152' of "ExampleApp." Upon identifying the authentication policy, the platform service 152' can then apply the identified authentication policy "ClientDelegationPolicy" to process the received access request 158 and the token 157. In other implementations, the foregoing processing can be performed at least in part by the authentication agent 160 or other suitable entities.

Figure 3B:
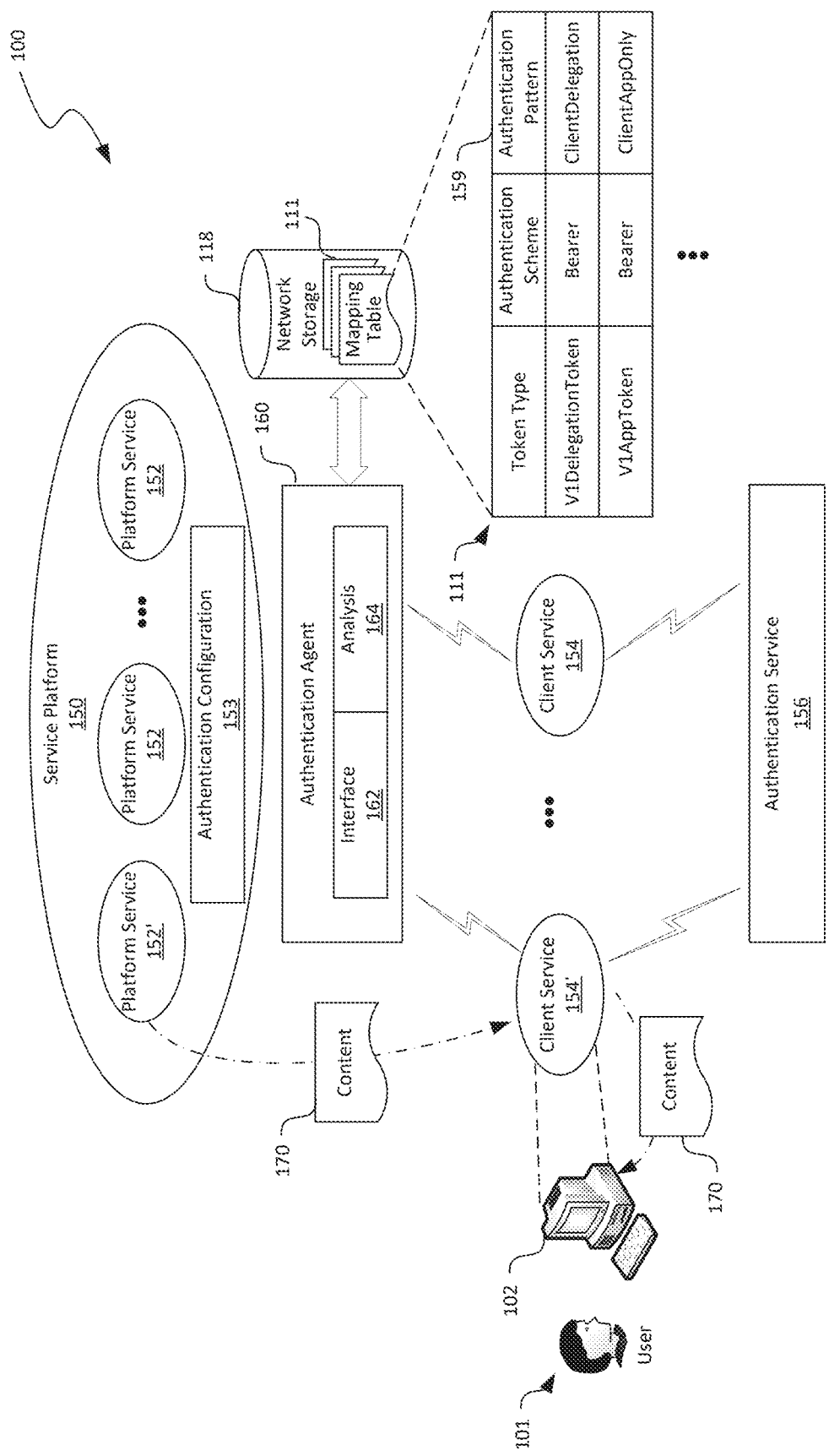
Figure 3C:
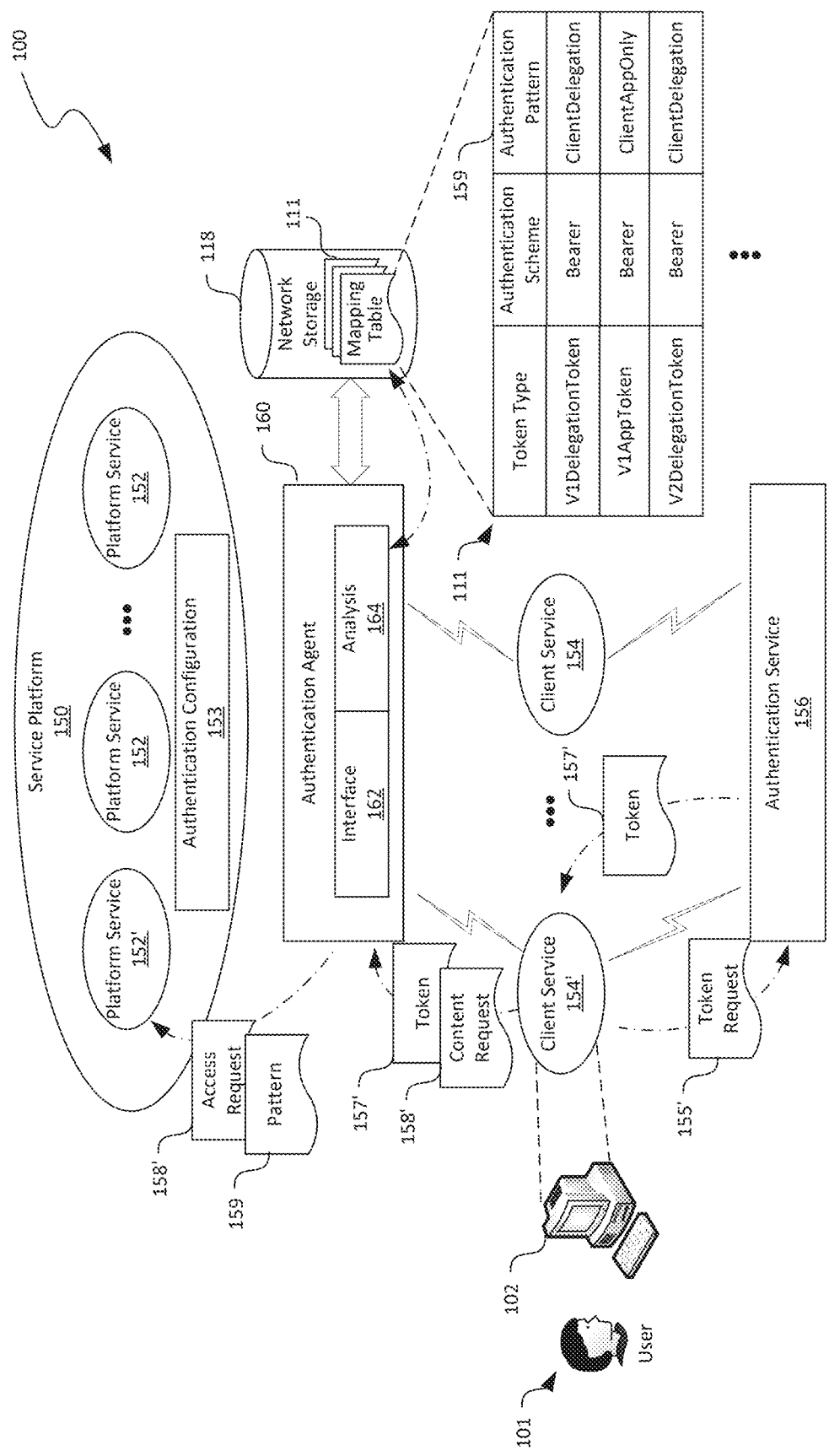

As shown in FIG. 3B, upon successful authentication, in certain embodiments, the platform service 152' can be configured to provide content 170 to the client service 154', which in turn forwards the content 170 to the client device 102 for outputting to the user 101. In other embodiments, the platform service 152' can also be configured to perform database record management, file operations, or other suitable actions in response to the access request 158 (FIG. 3A).

By identifying the authentication pattern 159, the authentication agent 160 can allow efficient modification, addition, or deletion of token types or authentication schemes without requiring changes of code logic at the platform service 152' or the authentication configuration 153. For instance, in the example shown in FIG. 3C, when the client service 154' switches to a new token type of "V2DelegationToken" instead of "V1DelegationToken," the authentication agent 160 can still identify the received access request 158' as corresponding to the same authentication pattern 159 by adding/modifying an entry in the mapping table 111 at the network storage 118. For instance, the same authentication pattern 159 "ClientDelegation" can be corresponded to a combination of token type "V2DelegationToken" and authentication scheme "Bearer" in addition to a combination of token type "V1DelegationToken" and authentication scheme "Bearer," as shown below:

| Token Type | Authentication Scheme | Authentication Pattern |
|---|---|---|
| V1DelegationToken | Bearer | ClientDelegation |
| V2DelegationToken | Bearer | ClientDelegation |

Figure 3D:
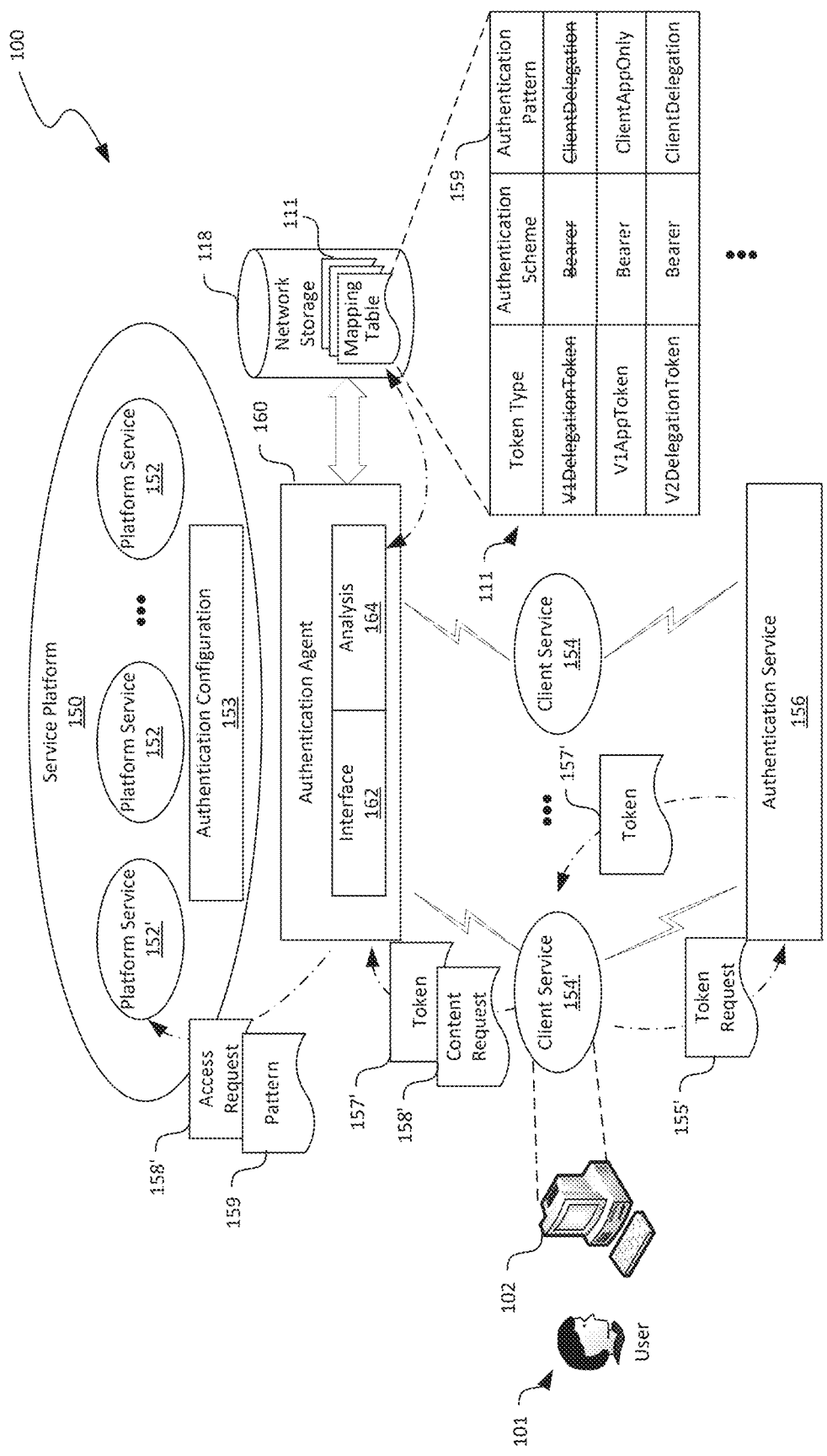

As such, authentication processing at the platform service 152' can remain the same as before, and thus avoiding changes in code logic at the platform service 152' or the authentication configuration 153. As shown in FIG. 3D, to remove the token type "V1DelegationToken" as an acceptable token type, the mapping table 111 can be modified to delete the entry corresponding to the combination of token type "V1DelegationToken" and authentication scheme "Bearer" (shown in FIG. 3D with strikethrough).

Figure 3E:
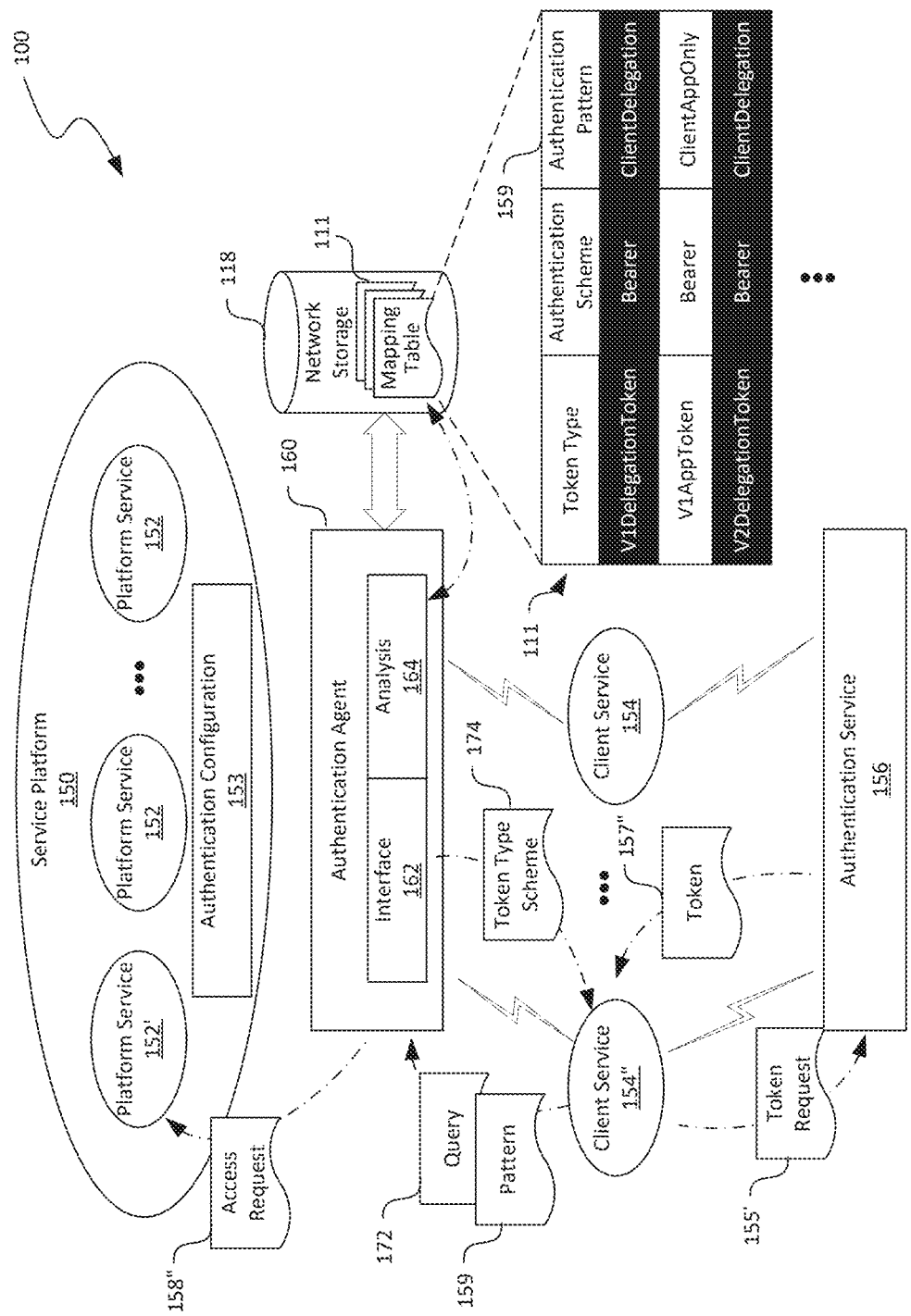

In certain embodiments, the authentication agent 160 can also be configured to allow discovery of available token types and authentication schemes acceptable to the platform services 154. For instance, a client service 154" (e.g., a backend service) can submit a query 172 to the authentication agent 160 along with an identification of an authentication pattern 159 (e.g., "ClientDelegation") for available token types and authentication schemes. In response, the authentication agent 160 can be configured to lookup the mapping table 111 to identify one or more entries having corresponding token types and authentication schemes. For example, as illustrated in FIG. 3E, the authentication agent 160 can be configured to identify both entries having "V1DelegationToken" and "V2DelegationToken" in the mapping table 111 (shown in reverse contrast for clarity).

In certain implementations, the authentication agent 160 can then provide all the identified combinations of token types and authentication schemes to the client service 154. In turn, the client service 154 can optionally select a combination of token type and authentication scheme and obtain a token 157" of the token type from the authentication service 156 before submitting the obtained token 157" with an access request 158" identifying the authentication scheme to the platform service 152'. In other implementations, the authentication agent 160 can be configured to select a combination of token type and authentication scheme based on, for instance, a date/time of deployment, a version number, or other suitable criteria. The authentication agent 160 can then provide the selected combination of token type and authentication scheme to the client service 154. In further embodiments, at least a portion of the foregoing discovery operations can be performed by a client library, a service library, or other suitable entities.

Figure 4A:
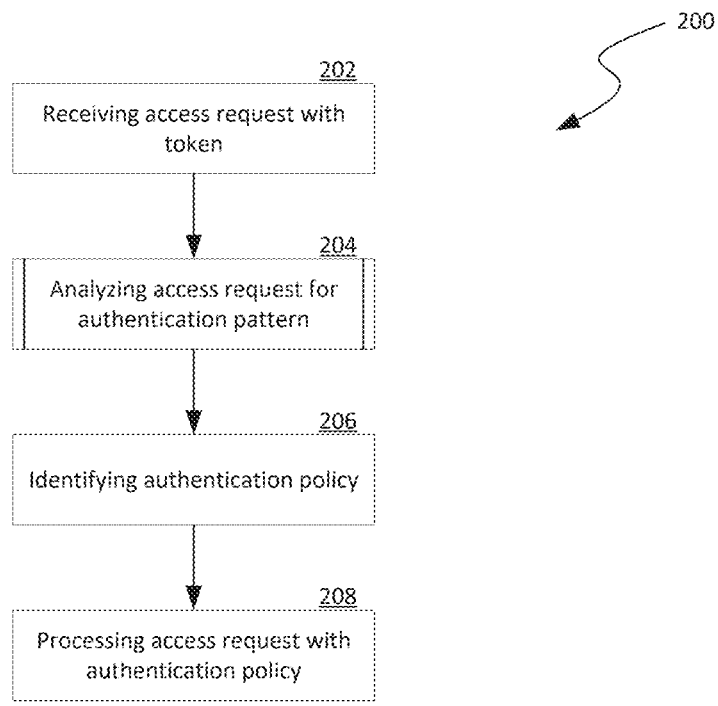
FIGS. 4A and 4B are flow diagrams illustrating aspects of processes for implementing service to service authentication in accordance with embodiments of the present technology.
Figure 4B:
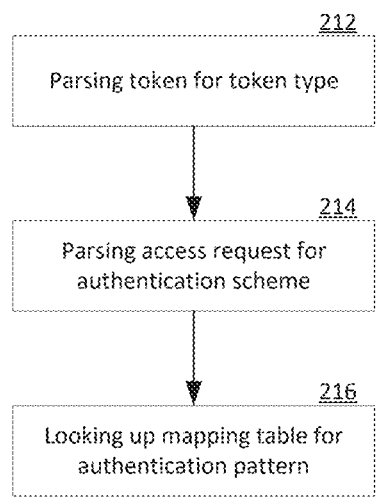

FIGS. 4A and 4B are flow diagrams illustrating aspects of a process 200 for implementing service to service authentication in accordance with embodiments of the present technology. Even though various aspects of the processes are described below in the context of the distributed computing system 100 in FIGS. 1-3E, in other embodiments, various aspects of the processes can also be implemented in computing systems with additional and/or different components.

As shown in FIG. 4A, a process 200 can include receiving an access request with a token for accessing a computing service at stage 202. The computing service can be a platform service 152 shown in FIG. 3A or other suitable types of computing service. The process 200 can then include analyzing the received access request and the token to determine an authentication pattern at stage 204. As described above with reference to FIGS. 3A-3E, an authentication pattern can be identified based on one or more features of the access request or token. An example authentication pattern includes a combination of a token type of the token and an authentication scheme identified or otherwise associated with the access request. Example operations of determining the authentication pattern are described in more detail below with reference to FIG. 4B.

The process 200 can then include identifying an authentication policy to be applied to the access request based on the authentication pattern at stage 206. As described above in more detail with reference to FIGS. 3A-3E, in certain embodiments, the authentication policy can be identified by looking up a mapping table 111 in FIG. 3A. The process 200 can then include processing the access request and the token with the identified authentication policy to conditionally provide suitable computing services in response to the access request at stage 208.

As shown in FIG. 4B, example operations of determining the authentication pattern can include parsing the token for a token type at stage 212. A token can include a digital data structure having various metadata or data fields sometimes referred to as claims. By parsing various metadata or data fields of a token, a token type can be determined from the values of the parsed metadata or data fields. The example operations can also include parsing the access request for one or more supported authentication scheme at stage 214. In certain implementations, a header field of the access request can contain one or more values indicating supported authentication schemes. In other implementations, such information can be attached or appended to the access request as data or metadata in other suitable ways. The example operations can then include looking up a mapping table using the combination of token type and authentication scheme as a key to locate a corresponding authentication pattern, as described in more detail above with reference to FIG. 3A.

FIG. 5 is a computing device 300 suitable for certain components of the distributed computing system 100 in FIG. 1, for example, the server 106, the client device 102, or the resource manager 110. In a very basic configuration 302, the computing device 300 can include one or more processors 304 and a system memory 306. A memory bus 308 can be used for communicating between processor 304 and system memory 306. Depending on the desired configuration, the processor 304 can be of any type including but not limited to a microprocessor (µP), a microcontroller (µC), a digital signal processor (DSP), or any combination thereof. The processor 304 can include one more level of caching, such as a level-one cache 310 and a level-two cache 312, a processor core 314, and registers 316. An example processor core 314 can include an arithmetic logic unit (ALU), a floating-point unit (FPU), a digital signal processing core (DSP Core), or any combination thereof. An example memory controller 318 can also be used with processor 304, or in some implementations memory controller 318 can be an internal part of processor 304.

Depending on the desired configuration, the system memory 306 can be of any type including but not limited to volatile memory (such as RAM), non-volatile memory (such as ROM, flash memory, etc.) or any combination thereof. The system memory 306 can include an operating system 320, one or more applications 322, and program data 324. As shown in FIG. 5, the operating system 320 can include a hypervisor 140 140 for managing one or more virtual machines 144. This described basic configuration 302 is illustrated in FIG. 5 by those components within the inner dashed line.

The computing device 300 can have additional features or functionality, and additional interfaces to facilitate communications between basic configuration 302 and any other devices and interfaces. For example, a bus/interface controller 330 can be used to facilitate communications between the basic configuration 302 and one or more data storage devices 332 via a storage interface bus 334. The data storage devices 332 can be removable storage devices 336, non-removable storage devices 338, or a combination thereof. Examples of removable storage and non-removable storage devices include magnetic disk devices such as flexible disk drives and hard-disk drives (HDD), optical disk drives such as compact disk (CD) drives or digital versatile disk (DVD) drives, solid state drives (SSD), and tape drives to name a few. Example computer storage media can include volatile and nonvolatile, removable and non-removable media implemented in any method or technology for storage of information, such as computer readable instructions, data structures, program modules, or other data. The term "computer readable storage media" or "computer readable storage device" excludes propagated signals and communication media.

The system memory 306, removable storage devices 336, and non-removable storage devices 338 are examples of computer readable storage media. Computer readable storage media include, but not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other media which can be used to store the desired information, and which can be accessed by computing device 300. Any such computer readable storage media can be a part of computing device 300. The term "computer readable storage medium" excludes propagated signals and communication media.

The computing device 300 can also include an interface bus 340 for facilitating communication from various interface devices (e.g., output devices 342, peripheral interfaces 344, and communication devices 346) to the basic configuration 302 via bus/interface controller 330. Example output devices 342 include a graphics processing unit 348 and an audio processing unit 350, which can be configured to communicate to various external devices such as a display or speakers via one or more NV ports 352. Example peripheral interfaces 344 include a serial interface controller 354 or a parallel interface controller 356, which can be configured to communicate with external devices such as input devices (e.g., keyboard, mouse, pen, voice input device, touch input device, etc.) or other peripheral devices (e.g., printer, scanner, etc.) via one or more I/O ports 358. An example communication device 346 includes a network controller 360, which can be arranged to facilitate communications with one or more other computing devices 362 over a network communication link via one or more communication ports 364.

The network communication link can be one example of a communication media. Communication media can typically be embodied by computer readable instructions, data structures, program modules, or other data in a modulated data signal, such as a carrier wave or other transport mechanism, and can include any information delivery media. A "modulated data signal" can be a signal that has one or more of its characteristics set or changed in such a manner as to encode information in the signal. By way of example, and not limitation, communication media can include wired media such as a wired network or direct-wired connection, and wireless media such as acoustic, radio frequency (RF), microwave, infrared (IR) and other wireless media. The term computer readable media as used herein can include both storage media and communication media.

The computing device 300 can be implemented as a portion of a small-form factor portable (or mobile) electronic device such as a cell phone, a personal data assistant (PDA), a personal media player device, a wireless web-watch device, a personal headset device, an application specific device, or a hybrid device that include any of the above functions. The computing device 300 can also be implemented as a personal computer including both laptop computer and non-laptop computer configurations.

From the foregoing, it will be appreciated that specific embodiments of the disclosure have been described herein for purposes of illustration, but that various modifications may be made without deviating from the disclosure. In addition, many of the elements of one embodiment may be combined with other embodiments in addition to or in lieu of the elements of the other embodiments. Accordingly, the technology is not limited except as by the appended claims.

We claim:

1. A method of service to service authentication in a distributed computing system having multiple servers executing instructions to provide multiple platform services interactable with client services, the method comprising:
receiving, from a client service, a data package having (i) an access request to a platform service in the distributed computing system and (ii) a security token for authenticating the access request to the platform service;
in response to receiving the data package having the access request and the security token,
identifying a token type of the security token and an authentication scheme indicated in the access request for authenticating the access request by analyzing the received data package and parsing metadata in a digital data structure of the security token;
using the identified token type of the security token and the authentication scheme indicated in the access request as a key to locate a corresponding authentication pattern in a mapping table of token types, authentication schemes, and authentication patterns, the token types being categorized based on one or more token structures, token issuers, or token versions;
authenticating the received data package having the access request and the security token by identifying, in an authentication configuration of the platform service, an authentication policy corresponding to the authentication pattern, the authentication policy indicating a policy ID to the access request that has the authentication pattern for the platform service; and
authenticating the access request based on the security token by applying the identified authentication policy to the received data package; and
conditionally providing the client service access to the platform service.

2. The method of claim 1, further comprising:
transmitting, from the client service, a token request and authentication credential to an authentication service in the distributed computing system; and
upon authenticating the token request based on the authentication credential, issuing, from the authentication service, the security token to the client service.

3. The method of claim 1, further comprising:
transmitting, from the client service, a token request and authentication credential to an authentication service in the distributed computing system;
upon authenticating the token request based on the authentication credential, issuing, from the authentication service, the security token to the client service; and
generating the data package having the access request to the platform service and the security token issued by the authentication service and transmitting the generated data package to the platform service.

4. The method of claim 1 wherein analyzing the received data package includes: parsing a header of the authentication request to identify the authentication scheme supported by the client service; and
parsing the security token to identify the token type of the security token.

5. The method of claim 1 wherein:
the authentication configuration of the platform service includes code identifying multiple authentication policies and corresponding authentication patterns; and
identifying the authentication policy includes scanning the code of the authentication configuration to locate the authentication policy corresponding to the authentication pattern.

6. The method of claim 1, further comprising:
receiving data representing a new token type of an additional security token to be used by the client service for accessing the platform service; and
in response to receiving the data, updating the mapping table with a new entry having a combination of the new token type and the authentication scheme corresponding to the same authentication pattern without modifying the authentication configuration of the platform service.

7. The method of claim 1, further comprising:
receiving data representing a new authentication scheme supported by the client service for accessing the platform service with the same token type; and
in response to receiving the data, updating the mapping table with a new entry having a combination of the token type and the new authentication scheme corresponding to the same authentication pattern without modifying the authentication configuration of the platform service.

8. The method of claim 1 wherein:
receiving data representing an instruction to deprecate the token type; and
in response to receiving the data representing the instruction, removing an entry in the mapping table corresponding to the token type and the authentication scheme without modifying the authentication configuration of the platform service.

9. The method of claim 1, further comprising:
receiving, from another client service, data representing a discovery request and another authentication pattern, the discovery request being for available token types and authentication schemes; and
in response to receiving the data representing the discovery request and the another authentication pattern,
querying the mapping table for one or more entries corresponding to the authentication pattern; and
transmitting the one or more entries identifying corresponding token types and authentication schemes to the another client service.

10. A computing device in a distributed computing system having multiple servers individually executing instructions to provide platform services interactable with client services, the computing device comprising:
a processor; and
a memory operatively coupled to the processor, the memory containing instructions executable by the processor to cause the computing device to:
upon receiving, from a client service, a data package having (i) an access request to a platform service provided in the distributed computing system and (ii) a security token for authenticating the access request to the platform service,
identify a token type of the security token and an authentication scheme indicated in the access request for authenticating the access request by analyzing the received data package and parsing metadata in a digital data structure of the security token, the token types being categorized based on one or more token structures, token issuers, or token versions;
query a mapping table using a combination of the identified token type of the security token and the authentication scheme indicated in the access request as a key to identify an authentication pattern corresponding to the combination of the identified token type of the security token and the authentication scheme; and authenticating the received data package having the access request and the security token by identifying, in an authentication configuration of the platform service, an authentication policy corresponding to the authentication pattern, the authentication policy indicating a policy ID to the access request that has the authentication pattern for the platform service; and authenticate the access request based on the security token by applying the identified authentication policy to the received data package; and conditionally provide the client service access to the platform service.

11. The computing device of claim 10 wherein to analyze the received data package includes to:

parse a header of the authentication request to identify the authentication scheme supported by the client service; and parse the security token to identify the token type of the security token.

12. The computing device of claim 10 wherein:

the authentication configuration of the platform service includes code identifying multiple authentication policies and corresponding authentication patterns; and to identify the authentication policy includes to scan the code of the authentication configuration to locate the authentication policy corresponding to the authentication pattern.

13. The computing device of claim 10 wherein the memory includes additional instructions executable by the processor to cause the computing device to:

receive data representing a new token type of an additional security token to be used by the client service for accessing the platform service; and in response to receiving the data, update the mapping table with a new entry having a combination of the new token type and the authentication scheme corresponding to the same authentication pattern without modifying the authentication configuration of the platform service.

14. The computing device of claim 10 wherein the memory includes additional instructions executable by the processor to cause the computing device to:

receiving data representing a new authentication scheme supported by the client service for accessing the platform service with the same token type; and in response to receiving the data, update the mapping table with a new entry having a combination of the token type and the new authentication scheme corresponding to the same authentication pattern without modifying the authentication configuration of the platform service.

15. The computing device of claim 10 wherein the memory includes additional instructions executable by the processor to cause the computing device to:

receive data representing an instruction to deprecate the token type; and in response to receiving the data representing the instruction, remove an entry in the mapping table corresponding to the token type and the authentication scheme without modifying the authentication configuration of the platform service.

16. The computing device of claim 10 wherein the memory includes additional instructions executable by the processor to cause the computing device to:

receive, from another client service, data representing a discovery request and another authentication pattern, the discovery request being for available token types and authentication schemes; and in response to receiving the data representing the discovery request and the another authentication pattern, query the mapping table for one or more entries corresponding to the authentication pattern; and transmit the one or more entries identifying corresponding token types and authentication schemes to the another client service.

* * * * *